United States Patent

Poggenburg et al.

[11] Patent Number: 5,631,836
[45] Date of Patent: May 20, 1997

[54] METHOD OF PRODUCING A STRAIGHT-ON TRAVEL SIGNAL

[75] Inventors: Rüdiger Poggenburg, Vaihingen; Eberhard Sonntag, Gerlingen, both of Germany; Thomas Meier, Le Vandore, France; Alfred Strehle, Fellbach, Germany

[73] Assignee: Robert Bosch GmbH, Stuttgart, Germany

[21] Appl. No.: 346,100

[22] Filed: Nov. 29, 1994

[30] Foreign Application Priority Data

Dec. 11, 1993 [DE] Germany .................. 43 42 332.9

[51] Int. Cl.$^6$ .................................................. B60T 8/72
[52] U.S. Cl. .................. 364/426.015; 364/423.098; 303/140
[58] Field of Search ................ 364/424.01, 424.05, 364/426.01, 426.02, 426.03, 436; 180/197; 303/95, 100, 106, 111, 104, DIG. 7

[56] References Cited

U.S. PATENT DOCUMENTS

| 4,809,176 | 2/1989 | Oowa et al. | 364/424.05 |
|---|---|---|---|
| 4,844,557 | 7/1989 | Giers | 303/140 |
| 5,124,921 | 6/1992 | Jonner et al. | 364/426.01 |
| 5,172,318 | 12/1992 | Meissner et al. | 364/426.02 |
| 5,265,472 | 11/1993 | Pfeifle et al. | 364/426.01 |
| 5,270,708 | 12/1993 | Kamishima | 364/436 |
| 5,270,933 | 12/1993 | Fennel et al. | 364/426.02 |
| 5,291,408 | 3/1994 | Thatcher | 364/426.03 |
| 5,313,922 | 5/1994 | Demel | 123/333 |
| 5,415,469 | 5/1995 | Poggenburg et al. | 303/106 |

FOREIGN PATENT DOCUMENTS 9406657  3/1994  WIPO .

*Primary Examiner*—Gary Chin
*Attorney, Agent, or Firm*—Felfe & Lynch

[57] ABSTRACT

Wheel speeds on each side of the vehicle are added, and the sums are subtracted to form a difference VXU which is time filtered to produce a filtered difference VXG. As long as VXU does not exceed VXG by more than a speed dependent threshold, a signal indicating straight line travel is produced. This signal can be cancelled when VXG exceeds a vehicle dependent threshold and is also blocked when the vehicle speed falls below a minimum, when the ABS is operating, or when the vehicle is decelerating. The signal indicating straight line travel accounts for tire tolerance and can be used to control vehicle dynamics, for example by preventing an increase in brake pressure or engine braking when the vehicle is travelling in a curve.

7 Claims, 1 Drawing Sheet

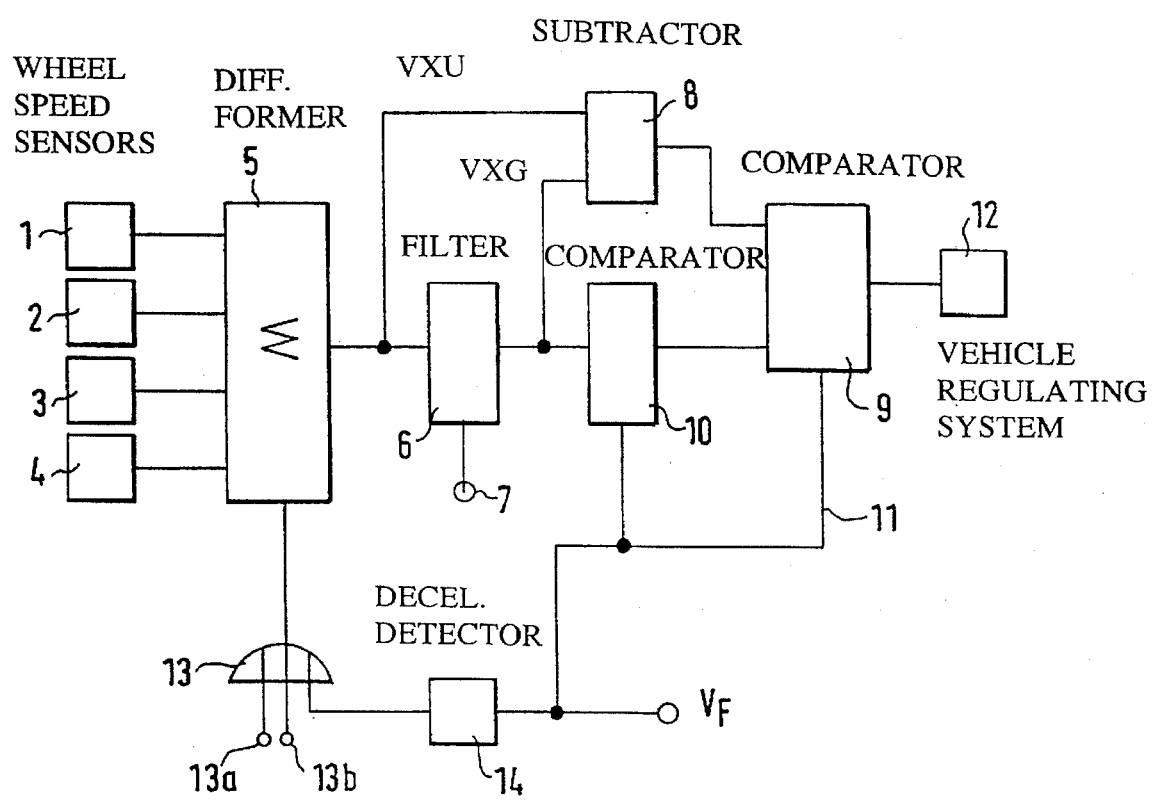

METHOD OF PRODUCING A STRAIGHT-ON TRAVEL SIGNAL

BACKGROUND OF THE INVENTION

When regulating travel dynamics it is advantageous if the system is informed whether the vehicle is travelling straight-on or is cornering. It is also important to have this information in the case of ABS systems e.g. when the braking force distribution is to be regulated. However the information can also be used for automatic slip control systems to optimize regulation.

A signal of this type indicating that a vehicle is travelling straight-on can be obtained in a simple manner as a result of the sums of the rotational speed signals of the wheels on the sides of the vehicle being compared with one another. As long as the difference VXU does not exceed a vehicle-dependent threshold it is detected that the vehicle is travelling straight-on.

In U.S. Pat. No. 5,415,469, incorporated herein by reference, the difference VXU is filtered to produce VXG, which is then compared to the threshold value. When VXG exceeds the threshold, travel in a curve is indicated, and an increase in brake pressure at the rear wheels is prevented.

In U.S. Pat. No. 5,313,922, incorporated herein by reference, a signal indicating travel in a straight line or a curve is used to influence the fuel supply to the engine. When travel in a curve is indicated, the braking force exerted by the engine on the driven wheels may be reduced.

U.S. Pat. No. 5,124,921 discloses a method for determining travel in a curve, wherein the curve detection signal can be used to shut down the delay of yaw speed build-up in an ABS.

SUMMARY OF THE INVENTION

According to the invention, the difference VXU–VXG is compared to a speed dependent threshold, and produces a straight line signal as long as the speed dependent threshold is not exceeded.

The advantage of the invention is that the comparison method can also be used when tolerances such as different tire sizes produce different wheel speeds which then simulate cornering. The signal produced according to the method can be used to regulate travel dynamics of the vehicle, in particular by controlling brake force at the wheels, according to any of the methods of the prior art.

BRIEF DESCRIPTION OF THE DRAWING

The sole figure is a schematic block diagram of the system. It will be appreciated that the method can also be performed using a correspondingly programmed microprocessor or the like.

DETAILED DESCRIPTION OF THE PREFERRED EMBODIMENT

The wheel speed sensors 1 to 4 associated with the four wheels of a motor vehicle produce signals which are delivered to a block 5 which forms the difference VXU between the sums of the wheel speed signals of the two vehicle sides $((V_{VL}+V_{HL})-(V_{VR}+V_{HR}))$. The resultant difference is filtered (averaged) in a time filter 6 with a time constant of 60 seconds for example. The time constant is selected such that the output signal of the filter no longer contains any brief speed deviations. It can be varied by a signal at a terminal 7. The signal can come from an anti-lock regulating system, the time constant decreasing with the delay for example.

The output signals of the blocks 5 and 6 are delivered to a subtractor 8 which deducts the filtered difference VXG from the momentary difference VXU. As a result thereof a portion of the speed difference occurring as a result of a tire tolerance is eliminated. The output signal of the subtractor 8 is delivered to a comparator 9 in which it is compared with a predetermined first threshold (e.g. 2% of the momentary speed). For this purpose the threshold is varied in dependence on the momentary speed ($V_F$) (line 11). An output signal is generated as long as the threshold of the comparator 9 is not exceeded. This signal indicates that the vehicle is travelling straight-on. It is supplied to a vehicle regulating system 12 (e.g. travel dynamics regulator or braking force regulator) where it is processed as a parameter.

In addition the filtered signal of the filter 6 can also be compared in a comparator 10 with a vehicle-specific second threshold speed value (e.g. 4 km/h) and if the threshold is exceeded, a signal can be generated which is likewise delivered to the comparator 9 where it causes the output signal to disappear, i.e. straight-on travel is no longer detected and consequently a system is engaged which increases travel stability. (At the same time this digital switch signal RTE can indicate the presence of tire tolerances (>±2%)).

Preferably the straight-on travel signal is only generated when the vehicle is travelling at a minimum speed of 50 km/h for example, when there is no ABS braking and when the vehicle motion is constant or accelerating. For this purpose a blocking signal is delivered from the exterior to the block 5 via an OR gate 13 if the speed threshold is not exceeded (signal at terminal 13a), or an ABS system announces that the ABS regulating system is running (terminal 13b) or when it is established in a deceleration detection block 14 to which the vehicle speed $V_F$ (e.g. $V_{Ref}$) is delivered that the vehicle speed determined momentarily is slower than the vehicle speed determined previously.

What is claimed is:

1. Method for controlling travel dynamics of a vehicle having right side wheels, left side wheels, brakes at said wheels, and an engine, said method comprising measuring the speed of at least one wheel on each side of the vehicle,
   determining a difference VXU between the speed of at least one wheel on the left side and the speed of at least one wheel on the right side,
   time-filtering said difference VXU to produce a time filtered difference VXG,
   forming a difference VXU–VXG,
   comparing said difference VXU–VXG to a first threshold, generating a signal indicating straight line travel when said difference VXU–VXG does not exceed said first threshold,
   blocking said signal indicating straight line travel upon occurrence of at least one of (a) an ABS is operating, and (b) the vehicle is deceleratinq, and
   controlling the traveling dynamics of the vehicle in accordance with whether or not the signal indicating straight line travel is present.

2. Method as in claim 1 wherein the speeds of both wheels on each side of the car are measured, and the sum of the wheel speeds on each side is formed, said difference VXU being formed by subtracting the sum of the wheel speeds on one side from the sum of the wheel speeds on the other side.

3. Method as in claim 1 wherein said first threshold is dependent on the speed $V_F$ of the vehicle.

4. Method as in claim 1 further comprising
   comparing said time filtered signal VXG to a second threshold, and cancelling said signal indicating straight line travel when said time filtered signal VXG exceeds said second threshold.

5. Method as in claim 1 wherein said signal is blocked only when said ABS is operating.

6. Method as in claim 1 wherein said signal is blocked only when the vehicle is decelerating.

7. Method for controlling travel dynamics of a vehicle having right side wheels, left side wheels, brakes at said wheels, and an engine, said method comprising measuring the speed of at least one wheel on each side of the vehicle, determining a difference VXU between the speed of at least one wheel on the left side and the speed of at least one wheel on the right side, time-filtering said difference VXU to produce a time filtered difference VXG, forming a difference VXU−VXG, determining a speed $V_F$ of the vehicle, comparing said difference VXU−VXG to a first threshold which is dependent on the speed $V_F$ of the vehicle, generating a signal indicating straight line travel when said difference VXU−VXG does not exceed said first threshold, and controlling the traveling dynamics of the vehicle in accordance with whether or not the signal indicating straight line travel is present.

* * * * *